United States Patent [19]

Armand et al.

[11] Patent Number: 4,578,326

[45] Date of Patent: Mar. 25, 1986

[54] NOVEL MACROMOLECULAR MATERIAL FOR USE IN REALIZING ELECTROLYTES AND/OR ELECTRODES

[75] Inventors: Michel Armand, Echirolles; Daniel Muller, Pau, both of France; Michel Duval, Montreal; Paul-Etienne Harvey, Longueuil, both of Canada

[73] Assignees: Societe Nationale Elf Aquitaine, Courbevoie, France; Hydro-Quebec, Montreal, Canada

[21] Appl. No.: 584,535

[22] Filed: Feb. 28, 1984

[30] Foreign Application Priority Data

Jun. 15, 1983 [FR] France .................. 83 09886
Mar. 11, 1983 [ID] Indonesia .................. 9 228

[51] Int. Cl.$^4$ .................. H01M 6/18; H01M 4/62
[52] U.S. Cl. .................. 429/192; 429/212
[58] Field of Search .................. 429/191, 192, 212; 252/62.2

[56] References Cited

U.S. PATENT DOCUMENTS 4,303,748 12/1981 Armand et al. .................. 429/192

FOREIGN PATENT DOCUMENTS 0037776 10/1981 European Pat. Off. .......... 429/192
2493609 5/1982 France .................. 429/192

Primary Examiner—Donald L. Walton
Attorney, Agent, or Firm—Weiser & Stapler

[57] ABSTRACT

The present invention relates to novel macromolecular materials constituted by a salt in solution in a copolymer of ethylene oxide and of a second monomeric unit the structure of which preserves on the chain a polyether structure.

The application of the invention is particularly useful in the realization of composite electrodes and electrolyte of primary or secondary electrochemical generators, thus necessitating the excellent conductivities of these materials.

36 Claims, 8 Drawing Figures

NOVEL MACROMOLECULAR MATERIAL FOR USE IN REALIZING ELECTROLYTES AND/OR ELECTRODES

BACKGROUND OF THE INVENTION

The present invention concerns a novel macromolecular material, especially for use in realizing electrolytes and/or electrodes for electrochemical generators.

DESCRIPTION OF THE PRIOR ART

European Patent No. 0013.199 the title of which is "Electrochemical generators for producing current and novel materials for their manufacture" describes a generator the electrolyte of which is made of an ionic conduction macromolecular material constituted, at least in part, by a solid solution of an ionic compound fully dissolved in a plastic solid macromolecular material. According to said European Patent No. 0013199, the macromolecular material is at least in part formed by one or several homo- or copolymers derived from one or several monomers comprising at least one heteroatom, for example oxygen or nitrogen, intended to form donor/acceptor type bonds with the cation of the ionic compound.

BRIEF SUMMARY OF THE INVENTION

The present invention concerns an improvement to these materials, particularly in the case where the macromolecular material is constituted by a polymer derived from ethylene oxide. Indeed, if the materials described in the above-mentioned application give good results, the inventors of the present application observed that it was possible to improve these materials in order to better its properties, both electrochemical and mechanical, allowing to realize high performance electrochemical current-generators.

Among the polymers cited in the above-mentioned patent application, experience has shown that the most favorable structure is that of ethylene polyoxide, due to the regular oxygen atom sequences and the favorable oxygen/carbon ratio that lead to very good solvation properties with respect to the salt cation in solution and to high conductivities. However, ethylene oxide polymers have the drawback of forming crystalline structures beginning at temperatures clearly higher than ambient temperature, these temperatures being a function, in particular, of the salt concentration in the polymer.

Accordingly, for temperatures lower than the melting-point of crystallites upon the appearance of an demixing phenomenon in two phases, a salt-rich crystalline phase having a high crystallite melting-point and a second polymer-rich amorphous phase are observed. This demixing phenomenon brings about a decrease in the ionic conductivity and a heterogeneity of material that is difficult to reverse. These two results are that much more prejudicial in that they render necessary not only using the electrolyte at a temperature higher than that of the said melting-point of the crystallite but also storing this material at the same temperatures.

A modification of the mechanical characteristics is also observed. Indeed, the presence of these two demixed phases brings about a decrease of the elasticity itself of the material, i.e. its flexibility and its warping or buckling capacity, but also brings about a decrease in its adhesive qualities. This decrease in its mechanical qualities is thus a drawback in the realization of electrochemical generators, particularly for the realization of composite electrodes such as those described in European Patent No. 0.013.199, and when they are associated to collectors and/or rigid electrodes. By way of example, the melting-point of the crystallites for an ethylene oxide polymer containing lithium perchlorate in solution with an oxygen/lithium atomic ratio of 8 is about 40° to 60° C.

On the other hand, if the use of a homopolymer such as propylene polyoxide and polymethylglycidylether is encouraged by their good qualities with respect to crystallization, it is limited by the low conductivity of these homopolymers.

The present invention provides for an improvement in the ionic conduction macromolecular materials that allows to realize generators operating at temperatures lower than the melting-point of ethylene polyoxide crystallites and crystallite complexes of ethylene polyoxide and dissolved salt(s) and that also presents improved characteristics for operation at temperatures higher than the said melting-point. Finally, they contain a much more reduced percentage of crystalline structure than the ethylene polyoxide, at any temperature, thus eliminating a large part of the drawbacks where in the use of ethylene polyoxide. Furthermore, they keep the small quantity of crystalline structures over a large range of salt concentrations.

For temperatures lower than this melting-point, in particular, the macromolecular materials thus realized have an improved conductivity and present a homogeneous structure. They allow, furthermore, to realize electrodes having excellent utilization coefficients, good for temperatures both higher and lower than this melting-point.

Indeed, the invention concerns an ionic conduction macromolecular material constituted by a solid solution of at least one ionic compound fully dissolved in a macromolecular material, the said macromolecular material being according to the invention, a copolymer of ethylene oxide and of a second monomeric unit selected from among the substituted or non-substituted cyclic ether oxides.

According to a first embodiment of the invention, the second monomeric unit of the copolymer is selected from among substituted cyclic ether oxides represented by the formula (1)

in which R represents:
  either a Ra alkyl or alkenyl radical comprising more particularly from 1 to 12, and preferably from 1 to 4 carbon atoms,
  or a —CH$_2$—O—Re—Ra radical in which Ra has the same signification as herein-above and Re represents a polyether radical having the formula (CH$_2$—CH$_2$—O)$_p$, p varying from 0 to 10, and the proportion of the second monomeric unit with respect to the ethylene oxide is selected so that the ionic conduction macromolecular material presents no crystallinity at the utilization temperatures while presenting good conductivity.

According to a first embodiment of the invention, the radical R can be an alkyl radical, preferably a methyl radical and the second monomeric unit is present in a quantity of higher than 0 and lower than 5%, in molar percentage with respect to the total number of moles. In a preferred manner, this percentage is comprised between 1.5 and 25% when the salt is lithium perchlorate, and is higher than 5% when the salt is a lithium trifluoromethanesulfonate.

According to this same embodiment, the radical R can be a —CH₂O—Re—Ra radical and preferably a —CH₂—O—CH₃, —CH₂—O—CH₂—CH=CH₂ "O—CH=CH₂" radical and the second monomeric unit is present in a quantity higher than zero- and lower than 30%, the percentage being a molar percentage expressed with respect to the total number of moles of the electrolyte. In a preferred manner, this percentage is comprised between 1.5 and 30% when the salt is lithium perchlorate and higher than 5% for lithium trifluoromethanesulfonate.

According to a second embodiment of the invention, the second monomeric unit of the copolymer is selected from among the substituted or non-substituted cyclic ether oxides, whose cycle comprises three bonds. Its molar percentage is preferably higher than zero and lower zo than 30%. By way of non-limitative example, these cyclic ether oxides the cycle of which comprises more than three bonds can be oxethane, tetrahydrofurane, 1-3,dioxane, dioxolane, and their substituted derivatives.

The applicants have indeed discovered that it was possible to improve the ionic conduction macromolecular materials of the prior art by using an ethylene oxide copolymer and a second monomeric unit such as those defined herein-above and the structure of which conserves to the chain its polyether character.

For example, in the case where the second monomeric unit is selected from among the ether oxides of formula (I), the chain obtained has an ethylene polyoxide structure certain hydrogen atoms of which are substituted by radicals. Their chain is characterized by a regular alternation of two carbons and an oxygen:

In the case where the second monomeric unit is selected from among cyclic ether oxides, the cycle of which comprises more than three chains, a polyether chain is obtained in which the oxygen atoms can be separated by more than two carbons or by a single carbon, according to the nature of the second initial monomeric unit.

For example, an methyl-3-oxetane-ethylene oxide copolymer will have the following structure:

a dioxolane-ethylene oxide copolymer a 3THF methyl ethylene oxide copolymer:

The applicants consider that the improvement proposed by the present invention and which is revealed especially by an increase in conductivity at ambient temperature, is principally due to the introduction, in a polyether type chain, of structural irregularities that allow to reduce, even to completely prevent, the appearance of crystallines phases at utilization temperatures, while conserving the polyether structure of the chain, i.e. its solvatation power of the salt in solution and without impairing the ionic mobility. This characteristic can allow to obtain an amorphous and isotropic material, i.e. a single amorphous phase that is thermodynamically stable, particularly at ambient temperature.

The result is that much more surprising as the improvement of the material with respect to the crystallization is accompanied by an increase in conductivity at ambient temperature, although the second monomeric unit of the copolymer performs less well in conductivity that the first monomeric unit. For example, a methyl glycidylether or propylene oxide type polymer presents very low conductivity. Despite this, if a copolymer is obtained from ethylene oxide and methylglycidylether or propylene oxide, a material is obtained the ionic conductivity of which is higher than an ethylene oxide homopolymer.

Preferably, the copolymer according to the invention is a static distribution copolymer.

According to a complementary characteristic, the molecular mass of the copolymers according to the invention is higher than 50 000, and preferably comprised between 100 000 and 1 000 000.

With respect to the ionic compound, any of those defined in the afore-mentioned European patent application published under No. 0.013.199 can be used, preferably sodium or lithium salts.

By way of example may be used the following ionic compounds belonging to:
the category of compounds that can be represented by the following overall formula:

in which:
M is an alkaline metal, preferably sodium or lithium, the R groups are aprotic hydrocarbon radicals, i.e. non proton-donor radicals containing a number of carbon radicals o generally lower than 15, preferably alkyl groups comprising up to 4 carbon atoms, the terminal methyl group being capable, where necessary, of being replaced by a phenyl group;
the category of ionic compounds that can be represented by the formula:

in which:
X is a halogen preferably fluorine;
n varies from 1 to 4;
Y is a CO or SO₂ group and
M is an alkaline metal, preferably sodium or lithium;
the category of halogenoborans is similar of the general formula:

in which:

M represents an alkaline metal, such as lithium or sodium, n is an integer equal to one of the three values 8, 10 or 12, X and Y, that can be equal or different, each represent a compound selected from among hydrogen, halogens, CN and a hydrocarbon radical preferably containing from 1 to 3 carbon atoms;

a and b are integers the total of which is equal to n;

or, furthermore, the category of ionic compounds represented by the following overall formula:

$$(R-C=C)_4^-, M^+$$

in which:

X is a trivalent element capable of being in coordinancy 4, such as boron or aluminum.

The R groups are aprotic hydrocarbon radicals, i.e. non protondonors radicals, M is an alkaline metal such as lithium, sodium and potassium.

These different ionic compounds which have been described in French patent application Nos. 8,204,623, 8,209,538 (corresponding to U.S. application Ser. No. 500,191 now U.S. Pat. No. 4,542,081filed June 1, 1983), 8,209,539 (corresponding to U.S. application Ser. No. 500,194, filed June 1, 1983) and 8,209,540 (corresponding to U.S. application Ser. No. 500,193, now U.S. Pat. No. 4,505,997 filed June 1, 1983 only constitute, of course, non-limitative examples of ionic compounds capable of being put into solution according to the invention.

Whatever the ionic compound used, the ratio of the number of heteroatoms issuing from the monomer monomeric unit used in the macromolecular material to the number of atoms of the alkaline metal of the ionic compound is generally comprised between 4 and 30, and preferably between 8 and 24.

All the ionic compounds described above are salts, the cation of which is monovalent. It is obvious that, without departing from the scope of the invention, ionic compounds can be used the cation of which is divalent, or even having a valency higher than 2. In this case, the man skilled in the art will be able to establish the limits of the ratio between the number of heteroatoms of the copolymer and the number of atoms of cations. For example, for a divalent cation, this ratio will preferably be chosen between 8 and 60. For example, barium, magnesium, lead or zinc, perchlorate may be used.

Therefore, the novel materials according to the invention are solid solutions of one or several ionic compounds in a macromolecular material, this solid solution principally being present in the form of a single amorphous phase, which is thermodynamically stable and wherein the macromolecular material is a copolymer of ethylene oxide and of at least one second monomeric unit selected from among the cyclic ethers, the said copolymer being principally constituted by a poly-ether type chain.

By way of principal application of this material, the invention foresees, operating its ionic conduction property for the realization of electrolytes as well as electrodes. The invention therefore concerns a composite electrode constituted by a mixture of at least one electrochemically active material and an ionic conduction macromolecular material constituted by a solid solution of an ionic compound fully dissolved in a macromolecular material.

According to a first variant, the electrode realized is the positive electrode, i.e. the electrode for which a reduction reaction occurs when the generator is discharged. This electrode is preferably constituted by a mixture of an electrochemically active material selected from among the chalcogenides, particularly titanium disulfide and along metallic oxides such as molybdenum oxide and vanadium oxide $V_6O_{13}$ of an electrolyte constituted by an ionic conduction macromolecular material such as defined herein-above and, eventually, a small percentage of carbon black, preferably acetylene black.

Preferably, these various electrochemically active elements are present in the form of a powder having a granulometry such that the diameter of the particles is smaller than 35 microns.

Similarly, the salt in solution is lithium salt and the ratio of the number of oxygen atoms to the number of lithium atoms is comprised between 8 and 24.

According to another variant of the invention, the electrode realized is a negative electrode, i.e. the electrode at which the oxidation reaction occurs when the generator discharges. In this case, the electrode is preferably constituted by an agglomerate of a lithium powder or an alloy of lithium and more particularly with aluminum, of the electrolyte constituted by a macromolecular material according to the invention and, possibly, of a small percentage of carbon black, the electrodes thus realized presenting excellent utilization coefficients over a wide range of temperatures.

Another advantage conferred by the utilization of a macromolecular material according to the invention for the realization of electrodes resides in the fact that such electrodes can be associated to any type of solid electrolyte. Furthermore, they present excellent adhesive characteristics with respect to the current collectors normally used, for example, those made of stainless steel.

In the case where this solid electrolyte is an ionic conduction macromolecular material, it is not necessary that its macromolecular material be identical to that of the electrode. In particular, it may be envisaged to use for the electrolyte a different homopolymer or copolymer. But it is also possible to use solid electrolytes of the beta alumina or lithium nitride type, or again ionic conduction glasses.

But the utilization of these macromolecular materials as ionic conductors is not limited to the realization of electrochecmical generators. Indeed, these new monophase materials that are thermodynamically stable over a wide range of temperatures, including in particular ambient temperature, can be used for any application using ionic transfers, for example, for electrochrome type display, for the realization of ionic space detectors, for photoactive systems.

Furthermore, they can be used principally by reason of their thermodynamic stability, each time that a macromolecular material is required in which a salt is dissolved and that is present in the form of a monophase amorphous system.

The ionic conduction macromolecular material according to the invention can be manufactured by any known process of copolymer synthesis, whether the syntheses are of the anionic or cationic type or further of the Vandenberg type, and of putting into solution ionic compounds in the macromolecular materials. Such methods of putting into solution are, for example, described in European patent application No. 0.013.199 cited herein-above In particular, an ex-solvent route from acetronitrile, methanol, benzene or tetrahydrofurane can be used.

The same applies for the realization of electrodes, whether negative or positive.

It is interesting to note that the choice of the monomers according to the invention presents the advantage of allowing to obtain macromolecular materials possessing a high molecular weight, which cannot always be realized with other monomers.

BRIEF DESCRIPTION OF THE DRAWINGS

The invention will be better understood and its advantages will become more apparent from reading through the following examples, given with reference to the annexed drawings in which.

Figure 1A:
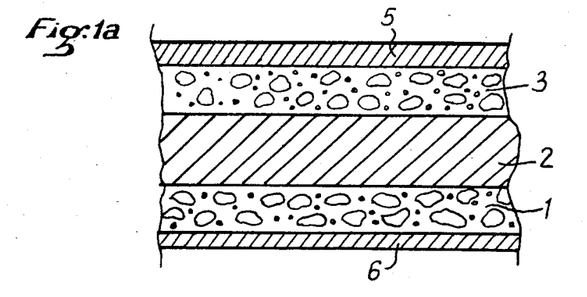
FIGS. 1a and 1b represent accumulators realized according to the invention.

FIG. 1a represents an electrochemical generator constituted by a positive electrode (1), an electrolyte (2) and a negative electrode (3), these three elements being realized according to the invention, and two collecting plates (5) and (6). The generator according to FIG. 1b comprises elements identical to those of the generator of FIG. 1a, except for the negative electrode (7) that is simply constituted by a lithium layer.

Figure 1B:
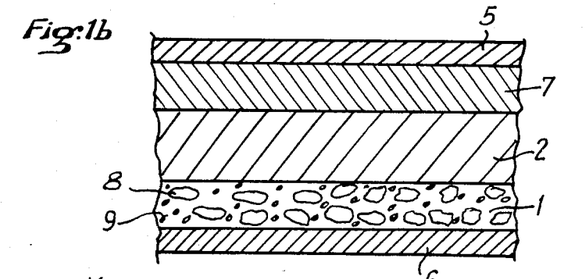

These accumulators have been used for the realization of the following examples; the composition and the nature of the different components will be explained in the same examples.

First series of examples

These examples are aimed at illustrating the improvement of the electrochemical performances of the generators realized according to the invention. Therefore, an accumulator the macromolecular material of which is an ethylene oxide polymer is compared to an accumulator the macromolecular material of which is a copolymer of ethylene oxide and methylglycidyl ether.

The accumulators of the type represented in FIG. 1a, i.e. the negative electrode and the positive electrode are both composite electrodes.

The first generator comprises an electrolyte (2) constituted by a poly (ethylene oxide), having a molecular weight of 900 000 in which is put into solution lithium perchlorate in a proportion such that the oxygen/lithium ratio is 7. The positive electrode (1) is a composite electrode comprising a mixture of $TiS_2$(8); electrolyte (2) and acetylene black (9) in a quantity of 15% by volume black with respect to the volume of electrode. The proportion of $TiS_2$ is 40% by volume for diameters of particles smaller than 35 microns. This positive electrode has a capacity of 8 Coulombs per $cm^2$.

The negative electrode (3) is a composite electrode constituted by a lithium-aluminum alloy having a granulometry identical to that of the $TiS_2$ powder used for the positive electrode associated to the electrolyte and to which has been added 15% by volume acetylene black.

This negative electrode had a capacity of about 20° C./$cm^2$.

The manufacture of the electrolyte and the electrodes was carried out by ex-solvent route.

The generator thus realized presents a total surface of 3$cm^2$ for a thickness of 300, the thickness of the electrolyte being about 150$\mu$. The two collectors (5) and (6) were realized, in stainless steel.

The second generator used in this comparative example is identical to the first, except that the electrolyte is an ionic conduction macromolecular material realized according to the invention and comprises as the macromolecular material, a copolymer of ethylene oxide and methylglycidylether, comprising in mole %, 97,5% ethylene oxide and 2,5% methylglycidylether. This copolymer was obtained through anionic synthesis and presents a molecular weight of about 700 000. The content in lithium perchlorate corresponds to a O/Li ratio of 7.

Figure 2:
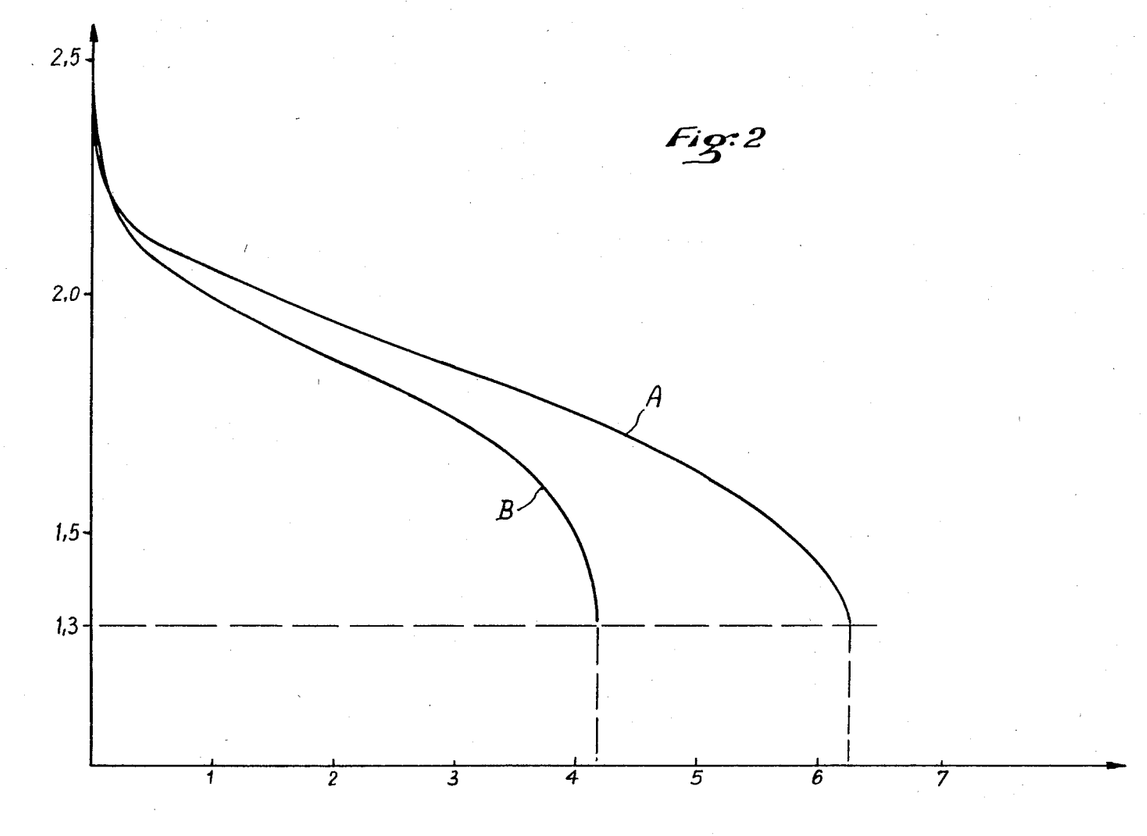
FIGS. 2 to 4 represent discharge graphs of accumulators according to the invention and of accumulators according to the prior art.

Two generators were thus realized that were caused to discharge under constant current conditions (125$\mu$A/$cm^2$) at a temperature close to 80° C. The discharge graphs (battery voltage/time) are represented in FIG. 2 for which the abscissae represent discharge time in hours while the ordinates represent the difference of potential at the terminals of the battery.

Graph A corresponds to the discharge of the generator according to the invention while graph B corresponds to the discharge of the generator for which the electrolyte is a homopolymer. It is noted that the generator according to the invention reached a voltage of 1.30 volt after about 6h15, while the homopolymer-based generator reached the same voltage after only 4 hours. Discharge time is thus improved by about 50%.

The applicants consider that this clear improvement of the performances of the accumulators thus obtained is due to the improved wetting and adhesion properties conferred on the composite electrodes by the material according to the invention.

For both generators, cyclings (charge-discharge) were carried out under identical conditions and it was observed that for the generator according to the invention, the discharge time diminishes less rapidly with progressive cycles than that of the homopolymer generator.

This result confirms therefore the improvement of the adhesion and wetting properties and shows that the utilization of the material according to the invention minimizes the contact problems between the material of the electrode and the electrolyte. These problems are essentially bound to the variations of volume of the electrodes during charges and discharges.

Second series of examples

This series is intended to illustrate the considerable improvement of performances observed at ambient temperature for accumulators the electrolyte of which is constituted by a material according to the invention.

Figure 3:
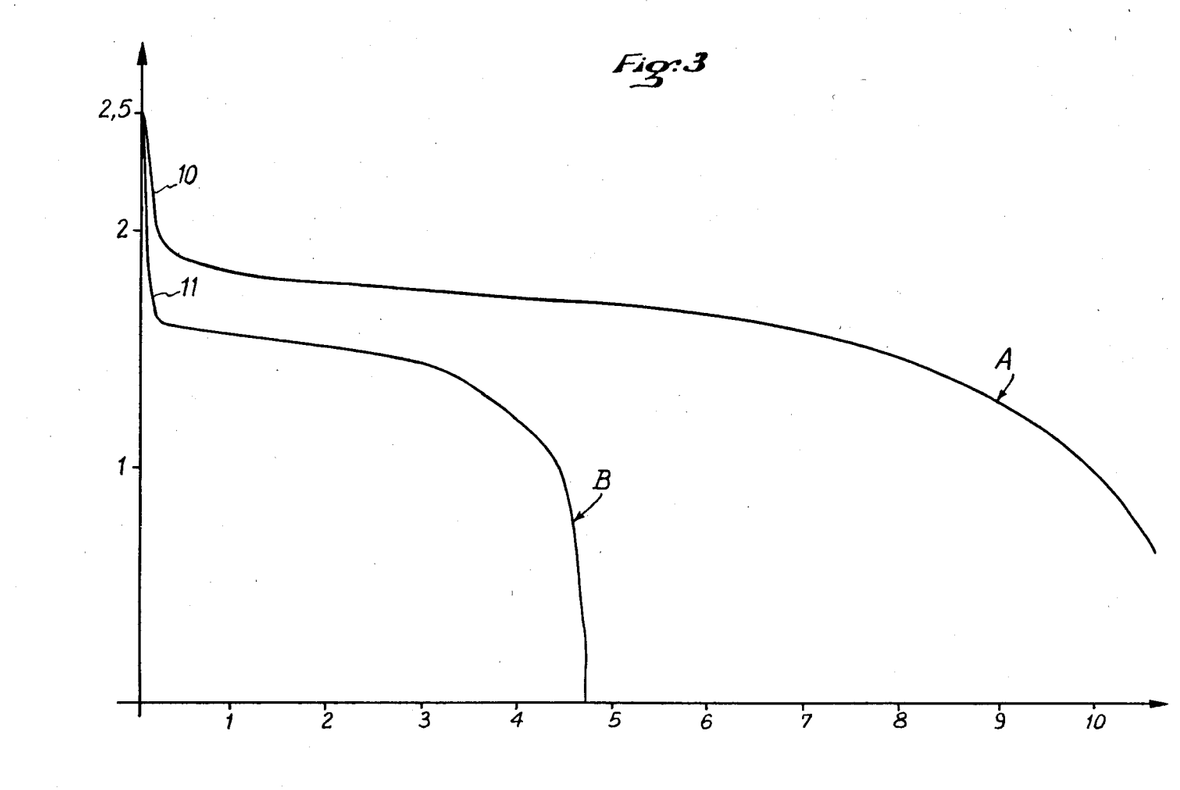

In this respect, FIG. 3 represents the discharge graphs under constant current conditions for an accumulator according to the invention and an accumulator according to the prior art.

Graph A of FIG. 3 corresponds to an accumulator similar to that used in the first series of examples and comprises a lithium-aluminum alloy-based negative composite electrode having an approximate capacity of 15 Coulombs per $cm^2$ and a $TiS_2$-based positive composite electrode having a capacity equal to 10° C./$cm^2$.

The electrolyte is constituted by an ethylene oxide and methylglycidylether (EO-MGE) copolymer comprising 97.5% ethylene oxide in molar percentage and 2.5% MGE in which a sufficient quantity of lithium perchlorate to obtain an oxygen/lithium atomic ratio of 12 has been dissolved.

The total surface of the accumulator is 3 cm$^2$ and the thickness of the electrolyte is 85 $\mu$. This discharge current was fixed at 100 $\mu$A.

Graph B of the same FIG. 3 corresponds to a battery similar to that of graph A except that the electrolyte is constituted by an ethylene oxide of a molecular weight of 900 000 for a thickness of 35 $\mu$. The surface of the battery is 85 cm$^2$ and the discharge current was maintained at 50 mA.

A comparison of the two graphs leads to the following observations.

Despite the fact that accumulator A shows an unfavorable surface ratio, its ohmic drop is lower. The ohmic drops are represented by portions 10 and 11 of the graphs A and B, these portions being substantially vertical. This result thus shows the good adhesion and wetting properties of the electrolyte according to the invention that thus encourages the contacts of the electrodes.

The utilization rates of the reactives, that are proportional to the integral of each graph vary substantially from 1 to 4 in favor of the accumulator according to the invention.

On the other hand, for each of these accumulators was measured the instantaneous current obtained by short-circuiting. For the accumulator of FIG. A, 2 mA or four times that of graph B was obtained, which allows to state that for identical surfaces, the short-circuit current is multiplied by 100 in case of the utilization of the electrolyte according to the invention.

Figure 4:
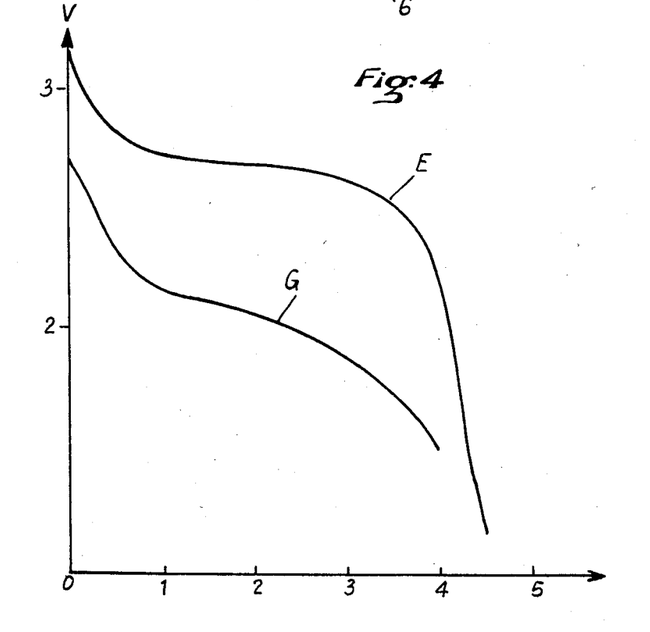

These two accumulators were stored at 25° for three months and no demixing was observed for the accumulator corresponding to FIG. 4 while that of graph B presents demixing visible to the naked eye.

Third series of examples

This series is intended to illustrate the beneficial effect resulting from the use of the material according to the invention in order to realize a non-rechargeable battery operating at room temperature (about 23° C.).

Three batteries E, F and G were realized. They each comprise a positive composite electrode comprising approximatively 20% by volume MnO$_2$ and 10% by volume acetylene black and presenting a capacity of 5 Coulombs for a surface of 3cm$^2$.

Battery E comprised a negative electrode constituted by a sheet of lithium of about 100$\mu$ thickness. The macromolecular material constituting the electrolyte and used to realize the composite of the positive electrode was constituted by an OE-MGE anionic polymer at 95% OE and 5% MGE (in molar percentage) having a molecular weight of 500 000 and containing LiClO$_4$ in an O/Li atomic ratio of 8. The electrolyte had a thickness of 85 microns.

FIG. 4 represents the discharge graph of this battery (graph E) for a current fixed at 50 $\mu$A.

Battery F contained the same elements, but the macromolecular material was a poly(ethylene oxide) mass having a molecular weight of 900 000. This battery proved to be unusable at the temperature of 23° C. since, for the same discharge current as battery E (50 $\mu$A), the voltage drops practically to zero after only several seconds of operation. The discharge graph has therefore not been plotted.

Battery G is identical to battery E except for the negative electrode where the lithium sheet is replaced by a finely dispersed aluminum lithium alloy such as used in the first series of examples.

When graphs E and G are compared, it is noted that the rate of utilization for identical discharge currents is substantially twice higher for battery G. It was thus shown that one of the interests of the ionic conduction macromolecular material according to the invention resides in the realization of electrochemical batteries for which the electrodes are composite electrodes.

The fact that the battery G presents an utilization rate clearly higher than that of battery E is fairly surprising when taking into account that the discharge of battery G occurs under a current double that of the battery E. Indeed, it is commonly admitted that in order to have a high utilization rate of the reactives, it is generally necessary to use only relatively low discharge currents. Then the invention allows to obtain a high utilization rate with a high discharge current.

Fourth series of examples

Accumulators identical to those used for the second series of examples were used, but in which the macromolecular materials, represented in the following table, differed in OE/MGE molar percentage.

Each accumulator was made to discharge under constant current conditions equal to 50 $\mu$A. It was observed that for batteries H, I, J, the discharge rate was similar to that of the OE-MGE battery of example II, while that of the battery K was closely comparable to a reference battery formed of the same constituents, but for which the macromolecular material was a methylglycidylether homopolymer, battery H giving the best results.

| Number | Material | % OE | % MGE |
|--------|----------|------|-------|
| H | OE—MGE | 90 | 10 |
| I | OE—MGE | 98 | 2 |
| J | OE—MGE | 80 | 20 |
| K | OE—MGE | 70 | 30 |

Fifth series of examples

This series of examples relates to a battery for which the macromolecular material is an ethylene oxide and propylene oxide copolymer.

Such a battery has been compared to a reference battery for which the macromolecular materials is poly-(ethylene oxide). Reference battery: the anode is a lithium sheet, the electrolyte is an ionic conduction macromolecular material constituted by lithium perchlorate in solution in a poly(ethylene oxide) of molecular weight equal to 300 000 the lithium/oxygen atomic ratio is 1/12. The positive electrode is a composite electrode composed of MoO$_2$ as the active material, of acetylene black and of the macromolecular material of the electrolyte.

The battery according to the invention is identical except that the ionic conduction macromolecular material is an ethylene oxide and propylene oxide polymer, comprising 3% in moles propylene and presenting a molecular weight equal to 200 000.

The two batteries were subjected to charge-discharge cycles at a temperature of about 80° C. and under constant current conditions so that theoretically the discharge of the battery is obtained in 10 hours (C/10).

For the reference battery, 80% of the theoretical capacity was obtained after 12 cycles, while for the battery according to the invention at 100% of the theoretical capacity 15 cycles was obtained.

For this same battery, 15 cycles at 100% of the theoretical capacity C/5 and 12 cycles at 50% for C/2 was obtained. It was thus shown that the ethylene oxide and propylene oxide polymers allow to realize batteries presenting excellent characteristics, and that these batteries conserve their wholeness during the charge and discharge cycles, which can be due to the good adhesion properties of the material and to its tacky character that thus clearly improves the contacts and coating of the composite of the positive electrode.

Sixth series of examples

In this series, a battery according to the invention and a reference battery were compared at cycling at 80° C.

Figure 5:
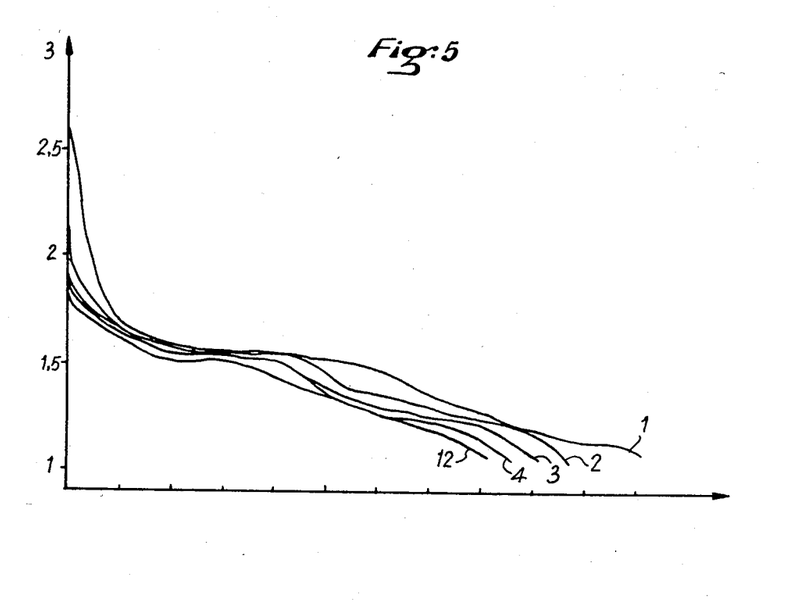
FIG. 5 represent discharge graphs of an accumulator according to the prior art obtained during a cycling.
Figure 6:
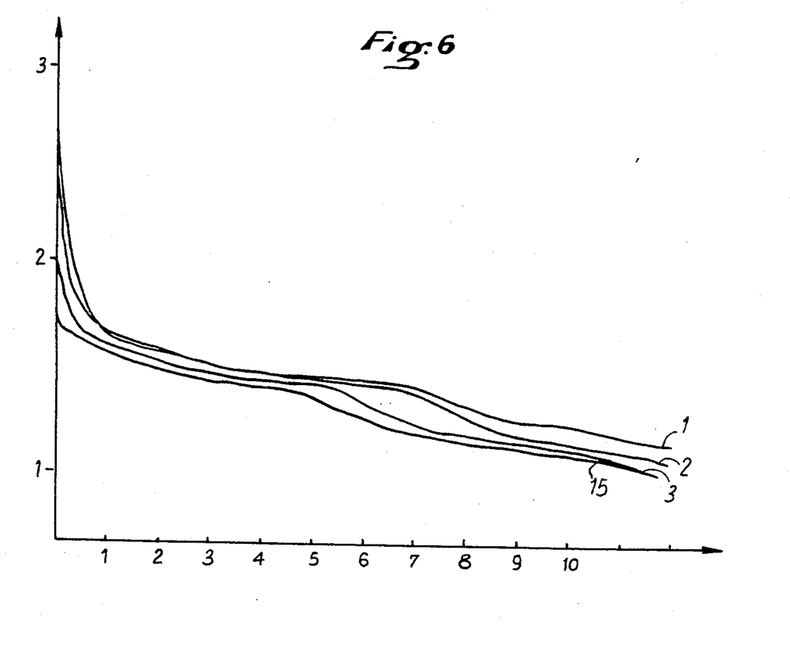
FIG. 6 represents discharge graphs of an accumulator according to the invention obtained during a cycling.

The battery according to the invention comprised a lithium anode, an electrolyte constituted by lithium perchlorate, in solution in an ethylene oxide and methylglycidylether (3% molar) copolymer, with an O/Li ratio of 8. The positive electrode is a composite realized from molybdenum bioxide, acetylene black and an electrolyte. For the reference battery, the same elements were used but the macromolecular material was a poly-(ethylene oxide). These two batteries were subjected to charge and discharge cycles, under constant current conditions such that, theoretically, the discharge of the battery is obtained in 10 hours (C/10). FIGS. 5 and 6 represent the variations of the discharge current in function of the time for a certain number of cycles, the reference number indicating the number of cycles carried out. The current is in volts and the time in hours. It is noted that for the reference battery, (FIG. 5), the time after which the discharge current reaches the value of 1 diminishes rapidly with the number of cycles, while for the battery according to the invention, it remains substantially constant although 15 cycles were carried out instead of 12.

Seventh series of examples

Finally, ethylene oxide and propylene oxide based materials were tested in a manner identical to the fourth series of examples and it was noted that from 20% propylene oxide (molar percentage) the characteristics of the batteries were no longer better than those of an ethylene homopolymer based battery.

Eighth example

In this examples, the macromolecular material studied is a copolymer of ethylene oxide and of epoxy butane:

Therefore a rechargeable generator having the following characteristics can be obtained:
negative electrode: lithium sheet
electrolyte: copolymer of ethylene oxide and epoxy butane (95% weight ethylene oxide) of a molecular weight equal to 400 000 and comprising in solution lithium perchlorate in an atomic ratio of 12/1.
positive electrode: composite electrode realized from molybdenum dioxide $MoO_2$ (20% by volume), methylglycidylether-ethylene oxide copolymer (73% by volume) and carbon black (7% by volume).

The performances obtained are the following: 35% utilization for a discharge of 7 $\mu A/cm^2$ at 30° C., thus C/50.

When the discharge graph of this battery is compared to a discharge graph obtained with a battery of which the electrolyte is an ethylene oxide-propylene oxide copolymer, it is noted that the two copolymers behave in an identical way since the graphs are similar and present the same plateaux.

Ninth example

Figure 7:
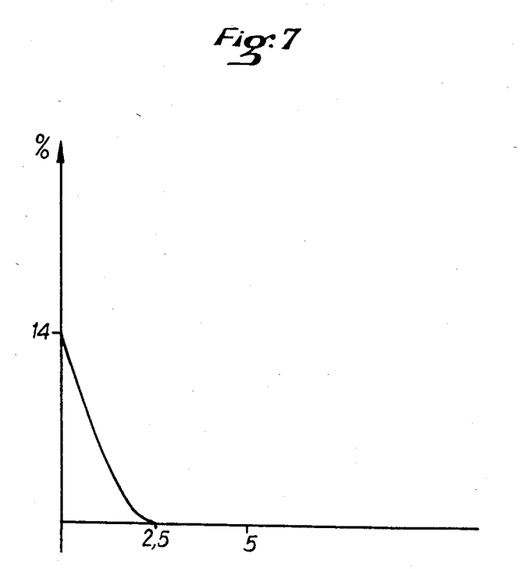
FIG. 7 represents the evolution of crystallinity of an ethylene oxide copolymer in function of its second monomeric unit content.

So as to fix the minimal concentration of the second monomeric unit in the material, the variation of the crystallinity (measured in %) of an OE-MGE copolymer in function of the molar concentration in MGE has been represented in FIG. 7. The salt used was lithium perchlorate and the Li/O atomic ratio of the copolymer was $\frac{1}{8}$ crystallinity being measured at 23° C.

It was noted that the crystallinity of the complex diminishes from 14% when zero % MGE is used up to 0% when 2.5% molar MGE is used.

This result may be compared to the one obtained for a POE without salt the crystallinity of which is approximately 70%, and for an OE/MGE copolymer (2.5% in moles of MGE) without salt, the crystallinity of which is approximately 15%.

Furthermore, using $LiCF_3SO_3$ which generally gives more crystalline complexes, it is necessary to increase the percentage of MGE in the copolymer above 5% in moles in order to reduce the crystallinity. As concerns $LiCF_3SO_3$, a battery has been realized with OE-MGE copolymer with 10% in moles of MGE, with a O/Li ratio of 7 and it has been controlled that a 80° C. this battery presented the same qualities as those in which the anion is perchlorate.

These examples are given only by way of illustration of the advantages conferred by the macromolecular material of the invention. Their results are not to be considered as limitative and certain of their parameters could be optimized without departing from the framework of the invention. This, the invention is in no way limited to the embodiments described herein-above but encompasses, on the contrary, all its variants.

We claim:

1. An ionically conductive macromolecular material having improved conductivity at temperatures higher and lower than the melting point of ethylene oxide crystallities which comprises a solid solution of at least one ionic compound dissolved in a macromolecular material, said macromolecular material being a copolymer of ethylene oxide and a cyclic ether oxide, said copolymer having a polyether structure and a proportion of cyclic ether units to ethylene oxide units whereby said macromolecular material is non-crystalline at ambient temperatures.

2. The ionically conductive macromolecular material according to claim 1 wherein said ether oxide is of the formula:

in which R represents:
an alkyl or alkenyl radical having 1 to 12 carbon atoms, or
a CH$_2$—O—Re—Ra radical, in which Ra is an alkyl or alkenyl radical having 1 to 12 carbon atoms and Re represents a polyether radial of the formula (CH$_2$—CH$_2$—O)$_p$, wherein p is from 0 to 10.

3. The ionically conductive macromolecular material according to claim 2 wherein R is an alkyl radical and said cyclic ether of oxide unit is present in a quantity of 0 -not included- to 25% in molar percentage with respect to the total number of moles.

4. The ionically conductive macromolecular material according to claim 3, wherein R is a methyl or ethyl radical.

5. The ionically conductive macromolecular material according to claim 3, wherein the ionic compound is lithium perchlorate and said cyclic ether oxide unit is present in amount higher than 3% molar and less than 25%.

6. The ionically conductive macromolecular material according to claim 2, wherein R is a CH$_2$—O—Re—Ra radical and said cyclic ether oxide unit is present in an amount from O- not included- to 30% in molar percentage expressed with respect to the total number of moles.

7. The ionically conductive macromolecular material according to claim 6, wherein R is CH$_2$—O—CH$_3$.

8. The ionically conductive macromolecular material according to claim 6, wherein the ionic compound is lithium perchlorate and said cyclic ether oxide unit is present in an amount higher than 2.5% molar and lower than 30%.

9. The ionically conductive macromolecular material according to claim 2, wherein the ionic compound is lithium trifluoromethanesulfonate and said cyclic ether oxide unit is present in an amount higher than 5%.

10. The ionically conductive macromolecular material according to claim 1, wherein said cyclic ether oxide unit is selected from among cyclic ether oxides having more than three bonds.

11. The ionically conductive macromolecular material according to claim 10, wherein said cyclic ether oxide unit is selected from the group consisting of oxetane, tetrahydrofurane, dioxolane, dioxane and their derivatives.

12. The ionically conductive macromolecular material according to claim 1, having a molecular weight higher than 50,000.

13. The ionically conductive macromolecular material according to claim 1, having a molecular weight comprised between 100,000 and 1,000,000.

14. Solid solution of an ionic compound in a macromolecular material, the said solid solution being present substantially in the form of a single amorphous phase, wherein the macromolecular material is a copolymer of ethylene oxide and of a least one second monomeric unit which is a cyclic ether oxide, said copolymer comprising a poly-ether type structure.

15. Solid solution according to claim 14, wherein the second monomeric unit is a substituted cyclic ether oxide of the formula (I):

in which R represents
an alkyl or alkenyl radical having 1 to 12 carbon atoms, or
a CH$_2$—O—Re—Ra radical, in which Ra is an alkyl or alkenyl radical having 1 to 12 carbon atoms and Re represents a polyether radical of the formula (CH$_2$—CH$_2$—O)$_p$, wherein p is from 0 to 10.

16. Solid solution according to claim 14, wherein the second monomeric unit is a cyclic ether oxide having a chain which presents more than three bonds.

17. Solid solution according to claim 14, wherein the second monomeric unit is selected from the group consisting of tetrahydrofurane, dioxolane, dioxane and their substituted derivatives.

18. Electrode material for electrochemical accumulators having improved wetting and adhesive properties comprising a mixture of at least one electrochemically active material, carbon black and an ionically conductive macromolecular material, wherein said macromolecular material comprises a solid solution of at least one ionic compound dissolved in a copolymer of ethylene oxide and of a second monomeric unit comprising a cyclic ether oxide, the said copolymer having a polyether type chain, the proportion of the second monomeric unit being chosen so that the macromolecular material does not have crystallinity at utilization temperatures; said macromolecular material having improved conductivity at temperatures higher and lower than the melting point of ethylene oxide crystallites and adhesive characteristics.

19. Electrode material according to claim 13, wherein said second monomeric unit is a cyclic ether oxide of the formula (I):

in which R represents
an alkyl or alkenyl radical having 1 to 12 carbon atoms, or
a CH$_2$—O—Re—Ra radical, in which Ra is an alkyl or alkenyl radical having 1 to 12 carbon atoms and Re represents a polyether radial of the formula (CH$_2$—CH$_2$—O)$_p$, wherein p is from 0 to 10.

20. Electrode material according to claim 19, wherein R is an alkyl radical and the second monomeric unit is present in an amount of from 0 to 25% in molar percentage with respect to the total number of moles.

21. Electrode material according to claim 20, wherein R is methyl.

22. Electrode material according to claim 21, wherein the ionic compound is lithium perchlorate and the second monomeric unit is present in an amount higher than 3% molar and lower than 25%.

23. Electrode material according to claim 19, wherein R is a CH$_2$—O—Re—Ra radical and the second monomeric unit is present in a quantity higher than zero and lower than 30%, in molar percentage expressed with respect to the total number of moles.

24. Electrode material according to claim 23, wherein R is $CH_2-O-CH_3$.

25. Electrode material according to claim 24, wherein the ionic compound is lithium perchlorate and the second monomeric unit is present in an amount higher than 2.5% molar and lower than 30%.

26. Electrode material according to claim 18, wherein the material of which it is formed has a molecular weight higher than 50,000.

27. Electrode material according to claim 26, wherein the said material has a molecular weight between 100,000 and 1,000,000.

28. Electrode material according to claim 18, wherein the ionic compound is lithium trifluoromethanesulfonate and said cyclic ether oxide unit is present in an amount higher than 5%.

29. Electrode material according to claim 18, wherein said cyclic ether oxide unit is a cyclic ether oxide having a chain of which comprises more than three bonds.

30. Electrode material according to claim 18, wherein said cyclic ether oxide unit is selected from the group consisting of tetrahydrofurane, dioxane, dioxolane and the derivatives thereof.

31. An electrochemical generator for producing an electrical current, comprising a negative electrode and a positive electrode separated from each other by an electrolyte which comprises macromolecular material having dissolved therein a solid solution of at least ionic compound, said macromolecular material being a copolymer of ethylene oxide and a cyclic ether oxide, said copolymer having a polyether structure and a proportion of cyclic ether units oxide to ethylene oxide units whereby said macromolecular material is non-crystalline at ambient temperatures, and has improved conductivity at temperatures higher and lower than the melting point of ethylene oxide crystallites.

32. The electrochemical generator of claim 31 wherein at least one of said electrodes comprises a mixture of inorganic electrochemically active material and said ionically conductive macromolecular material.

33. The electrogenerator of claim 32 wherein said electrode with the macromolecular material is the positive electrode and comprises a mixture of said ionically conductive macromolecular material and inorganic electrochemically active material selected from the group consisting of chalcogenides and metal oxides.

34. The electrochemical generator of claim 33 wherein said electrode includes carbon black or acetylene black.

35. The electrochemical generator of claim 32 wherein said electrode with the macromolecular material is the negative electrode and comprises a mixture of said ionically conductive macromolecular material and inorganic material selected from the group consisting of lithium and aluminum.

36. An electrode structure in which the electrode material comprises inorganic electrochemically active material and ionically conductive macromolecular material, said macromolecular material having dissolved therein a solid solution of at least one ionic compound, said macromolecular material being a copolymer of ethylene oxide and a cyclic ether oxide having a polyether structure with a proportion of cyclic ether units to ethylene oxide units whereby said macromolecular material is non-crystalline at ambient temperature and provides improved melting and adhesive properties to the electrode.

* * * * *